(12) United States Patent
Salmon-Legagneur et al.

(10) Patent No.: US 9,471,758 B2
(45) Date of Patent: Oct. 18, 2016

(54) METHOD, A DEVICE AND A COMPUTER PROGRAM SUPPORT FOR VERIFICATION OF CHECKSUMS FOR SELF-MODIFIED COMPUTER CODE

(75) Inventors: Charles Salmon-Legagneur, Rennes (FR); Antoine Monsifrot, Rennes (FR)

(73) Assignee: Thomson Licensing (FR)

( * ) Notice: Subject to any disclaimer, the term of this patent is extended or adjusted under 35 U.S.C. 154(b) by 831 days.

(21) Appl. No.: 12/932,041

(22) Filed: Feb. 16, 2011

(65) Prior Publication Data
US 2011/0258516 A1 Oct. 20, 2011

(30) Foreign Application Priority Data

Apr. 16, 2010 (EP) .................................. 10305394

(51) Int. Cl.
*G06F 11/30* (2006.01)
*G06F 12/14* (2006.01)
*G06F 21/14* (2013.01)
*G06F 21/54* (2013.01)

(52) U.S. Cl.
CPC ............... *G06F 21/14* (2013.01); *G06F 21/54* (2013.01)

(58) Field of Classification Search
CPC ...................................... G06F 21/14
USPC ........................................ 713/187
See application file for complete search history.

(56) References Cited

U.S. PATENT DOCUMENTS

| | | | |
|---|---|---|---|
| 6,681,329 B1 | 1/2004 | Fetkovich | |
| 7,080,257 B1 | 7/2006 | Jakubowski et al. | |
| 2002/0038428 A1 | 3/2002 | Safa | |
| 2002/0138748 A1* | 9/2002 | Hung | 713/190 |
| 2003/0098775 A1* | 5/2003 | Hazard | 340/5.8 |
| 2003/0188231 A1 | 10/2003 | Cronce | |
| 2005/0240582 A1* | 10/2005 | Hatonen et al. | 707/6 |
| 2007/0005992 A1 | 1/2007 | Schluessler | |
| 2007/0234070 A1* | 10/2007 | Horning et al. | 713/190 |
| 2008/0163375 A1 | 7/2008 | Savagaonkar | |
| 2008/0168564 A1* | 7/2008 | Lerouge et al. | 726/26 |
| 2009/0178022 A1* | 7/2009 | Horne et al. | 717/106 |

(Continued)

FOREIGN PATENT DOCUMENTS

| | | |
|---|---|---|
| CN | 1575445 | 2/2005 |
| EP | 1942431 | 7/2008 |

(Continued)

OTHER PUBLICATIONS

Wikipedia, Checksum, Dec. 19, 2008, http://en.wikipedia.org/wiki/Checksum.*

(Continued)

*Primary Examiner* — Andrew Nalven
*Assistant Examiner* — Khang Do
(74) *Attorney, Agent, or Firm* — Jack Schwartz & Associates, PLLC

(57) ABSTRACT

A function of a software program is stored in a memory during execution in a device of the software program. A processor relocates the function in a region of the memory comprising dummy code, transforms the dummy code in a predictable manner, generates a predicted checksum for the region based on a previous checksum, generates a calculated checksum over the region, and verifies the integrity of the function by comparing the predicted checksum and the calculated checksum. Also provided are a device and a computer program product.

21 Claims, 3 Drawing Sheets

(56) References Cited

U.S. PATENT DOCUMENTS

2009/0235019 A1* 9/2009 Costin et al. ............... 711/105
2010/0309933 A1* 12/2010 Stark et al. ............... 370/503
2011/0202996 A1 8/2011 Monsifrot et al.

FOREIGN PATENT DOCUMENTS

| EP | 2075728 | | 7/2009 | |
| FR | EP2075728 | * | 7/2009 | ............ G06F 21/00 |
| JP | 6242957 | | 9/1994 | |
| JP | 2000148601 | | 5/2000 | |
| JP | 2004511031 | | 4/2004 | |
| JP | 200585188 | | 3/2005 | |
| JP | 2005266887 | | 9/2005 | |
| WO | WO9833106 | | 7/1998 | |
| WO | WO0206925 | | 1/2002 | |

OTHER PUBLICATIONS

Bhatkar et al., "Address Obfuscation; An Efficient Approach to Combat a Broad Range of Memory Error Exploits", Proceedings of the USENIX Security Symposium. USENIX, 2003.
Wikipedia article entitled "Checksum" Jun. 10, 2013.
Wikipedia article entitled "Checksum" Nov. 26, 2008.
Kil C., "Mechanisms for protecting Software Integrity in Networked Systems", North Carolina State University Doctoral Thesis in Computer Science, Dec. 2, 2008, pp. 1-103.

* cited by examiner

METHOD, A DEVICE AND A COMPUTER PROGRAM SUPPORT FOR VERIFICATION OF CHECKSUMS FOR SELF-MODIFIED COMPUTER CODE This application claims the benefit, under 35 U.S.C. §119 of EP Patent Application 10305394.8, filed 16 Apr. 2010.

TECHNICAL FIELD

The present invention relates generally to software, and in particular to ensuring the integrity of dynamically relocated software.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is relatively common for software providers to protect the integrity of a computer program with the goal of making sure that the program performs as intended. However, hackers commonly try to hack the program to perform in different ways. An example is that hackers sometimes wish to modify the code to get around access control features of the program in order to be able to use it without the necessary access rights.

Such reverse engineering of protected software is, for several reasons, an iterative process. First, an application is usually too big to be fully executed step by step. Second, when a protection mechanism detects a reverse activity, the hacker must restart the execution of the application to continue the analysis. An efficient means of preventing a hacker from learning from one execution to the next is address space randomization, as it thwarts the use of a breakpoint on a function previously pinpointed at a known address.

At present, address space randomization is mainly used in contexts like Address space layout randomization (ASLR) in stacks to prevent buffer overflow attacks. For example, ASLR makes the location of a section unpredictable in order to be resistant to replay attacks. Going one step further, some applications dynamically replace a portion of code at a random address. Bhatkar et al. (see Sandeep Bhatkar, Daniel C. DuVarney, and R. Sekar. Address Obfuscation: An Efficient Approach to Combat a Broad Range of Memory Error Exploits. In Proceedings of the USENIX Security Symposium. USENIX, 2003) present a different method to use address space randomization for code protection. However, they consider it impossible to introduce randomization address space at a smaller granularity than code segment.

In addition, address space randomization also makes the use of software integrity verification more difficult since the code moves in the memory space.

To counter tampering attacks, such integrity verification techniques are used to ensure that the code has not been modified.

Prior art methods of verifying the integrity of a program compute a signature (a.k.a. checksum) over at least some parts of the code. A signature may for example be a hash value, calculated over the parts of the code, and then signed using a secret key. The skilled person will appreciate that numerous other possibilities exist. During program execution, the signature of the code is calculated at least once. To increase the security level, the functions that calculate the signatures are nested, so that the integrity of each function is verified by at least one other function. Thus, if just one function remains intact, it will detect tampering with at least one other function. Further details and explanations may for example be found in US 2003/188231 and EP 1942431, and US 2002/138748 teaches how to determine integrity for relocatable code.

Unfortunately, integrity verification techniques are vulnerable to reverse engineering, such as the use of hardware breakpoints.

As also software integrity verification is a useful tool against reverse engineering, it will be appreciated that there are situations where it is desired to ensure the integrity of a software program that uses address space randomization.

It is thus a problem to check the integrity of dynamically relocated code.

A trivial solution is to pass the range of the relocated code as an input parameter to a checksum function. From a security point of view, this is not acceptable since it reveals the range of the protected function and the reference value to an attacker.

It will thus be appreciated that there is a need for a solution that enables the computation of a checksum on a relocated function, without revealing such details about the function. The present application provides such a solution.

SUMMARY OF INVENTION

In a first aspect, the invention is directed to a method of relocating function code in a memory during execution in a device of a software program comprising the function code. A processor relocates the function code in a region of the memory comprising dummy code, transforms the dummy code in a predictable manner, generates a predicted checksum for the region based on a previous checksum, generates a calculated checksum over the region, and verifies the integrity of the function code by comparing the predicted checksum and the calculated checksum.

In a first preferred embodiment, the checksum for the region is a combination of a checksum for the function code and a checksum for the dummy code.

It is advantageous that the function code is position independent with a constant checksum value. It is also advantageous that the checksum of the function code for the predicted checksum is calculated using a relocation table. It is further advantageous that the transformation of the dummy code comprises permutation; preferably the checksum of the dummy code is unchanged by the transformation, and preferably the transformation of the dummy code comprises permutation as blocks of a predetermined size. It is also advantageous as an alternative that the transformation is linear with a predictable effect on the checksum of the dummy code.

In a second preferred embodiment, the dummy code is real code.

In a third preferred embodiment, the function code is implemented as a module or as an instruction block.

In a second preferred embodiment, the region of the memory comprises further function code and further dummy code that also are used when a checksum value is calculated.

In a second aspect, the present invention is directed to a device for execution of a software program and relocation of function code of the software program in a memory during execution of the software program. The device comprises a memory for storing the function code and dummy code in a region of the memory; and a processor for relocating the function code in the region of the memory, transforming the dummy code in a predictable manner, generating a predicted checksum for the region based on a previous checksum, generating a calculated checksum over the region, and verifying the integrity of the function code by comparing the predicted checksum and the calculated checksum.

In a third aspect, the invention is directed to a computer program product having stored thereon instructions of a software program, wherein the instructions, when stored in a memory and executed by a processor performs the method of the first aspect of the invention.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
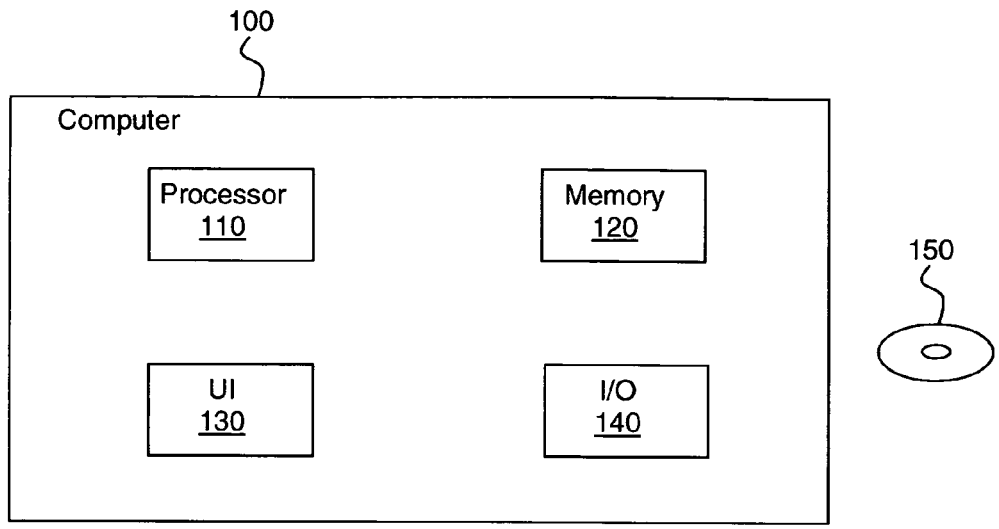
FIG. 1 illustrates an exemplary computing device on which the invention may be implemented.

FIG. 1 illustrates an exemplary computing device ("computer") 100 on which the invention may be implemented. The computer 100 can be any kind of suitable computer or device capable of performing calculations, such as a standard Personal Computer (PC). The computer 100 comprises at least one processor 110, RAM memory 120, a user interface 130 for interacting with a user, and a second interface 140 for reading a software program for performing the method of the invention from a digital data support 150. The skilled person will appreciate that the illustrated computer is very simplified for reasons of clarity and that a real computer in addition would comprise features such as network connections and persistent storage devices.

Figure 2:
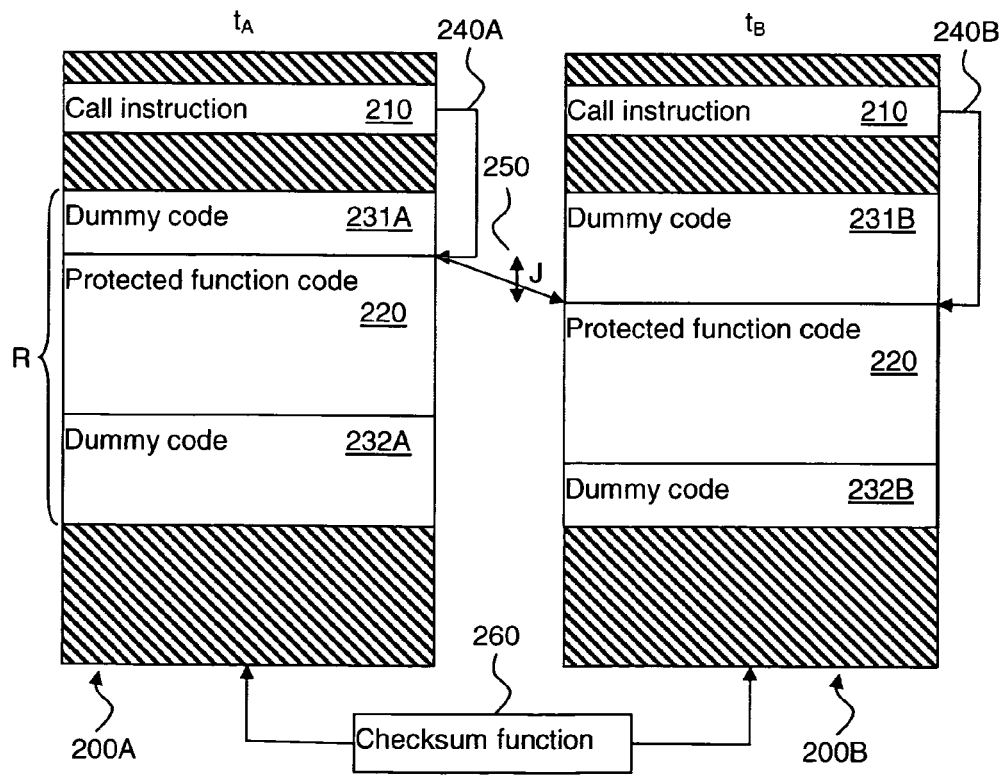
FIG. 2 illustrates integrity verification of relocatable code according to a preferred embodiment of the present invention.

FIG. 2 illustrates integrity verification of self-modifying relocatable code according to a preferred embodiment of the present invention. FIG. 2 illustrates contents of a memory 200 at two different times, $t_A$ and $t_B$, wherein $t_A$ is prior to $t_B$; the memory at $t_A$ is denoted 200A and the memory at $t_B$ is denoted 200B, but it will be appreciated that it normally is the same physical memory. $t_A$ may correspond to an initial state, i.e. with the function code in its original location, but it may also correspond to a 'relocated' state in which the function code has been relocated at least once.

At $t_A$, the memory 200A comprises a call instruction 210, a first area with dummy code 231A, protected function code 220, and a second area with dummy code 232A. The areas of dummy code 231A, 232A and the protected function code 220 are adjacent in the memory, forming a region R that is used as a checksum range. Checksum verification is performed by checksum function 260. During execution, the call instruction 210 calls 240A the address of the protected function 220. The diagonally hatched areas are intended to illustrate memory areas—e.g. empty or storing other functions—that are not relevant to the preferred embodiment of the present invention. The protected function 220 may for example be a module, i.e. a group of (blocks of) instructions, or a block of one or more instructions.

At $t_B$, the protected function 220 has been relocated 250 to a second, preferably random, address in the memory 200B that further comprises the call instruction 210, a first area with dummy code 231B, and a second area with dummy code 232B. The second address is such that the entire protected function 220 still lies in the region R, and the areas of dummy code 231B, 232B and the protected function code 220 are adjacent in the memory, forming the region R. The difference in addresses is illustrated as jitter J. During execution, the call instruction 210 calls 240B the address of the relocated protected function 220 (i.e. the second address). Checksum verification is performed by checksum function 260.

It will be appreciated that the first area of dummy code 231A, 231B or the second area of dummy code 232A, 232B may be non-existent, which is to say that the protected function either starts right at the beginning of the region R or ends right at the end of the region R. It will also be appreciated that the protected function code 220 may either be identical or different (e.g. by comprising adjusted addresses for function calls) before and after the relocation. It will further be appreciated that the call function may be identical or different (transformed) before and after the relocation.

Thus, reverse engineering attacks based upon hardware breakpoints are countered by the addition of jitter J around the addresses of protected functions. A protected function is relocated—regularly, at varying intervals or at least once—to a different, preferably random, address inside the region R filled with dummy code. More than one region R may be used to protect a software program. To ensure the anti-tampering, the region R is combined with a checksum function 260.

One way of putting it is that the invention involves two actors: the checksum function 260 and a code modification engine.

The checksum function 260 is preferably dedicated to a region R to protect. The region R includes dummy code as well as the code of the function to protect. At any time, the checksum value of R is predictable if the protected function code does not change over the time and has a constant checksum value (or if the changes are predictable), and the dummy code is transformed over time in a predictable manner so as to enable deterministic prediction of the checksum value.

The code modification engine is preferably embedded within the application and auto-modifies at least the protected function code by relocating the protected function in the region R (as illustrated in FIG. 2), by fixing the calling points of the protected function to the new shifted offset, and by transforming the dummy code. The transformation of the dummy code preferably comprises using a second function to perform permutations and possibly to encrypt the dummy code using an encryption method that generates a predictable output so as to enable prediction of the checksum value. The integrity value of the dummy code thus changes over the time in a predictable manner.

In a preferred embodiment, the checksum value of the protected function does not change after relocation. This is possible if the function comprises position independent code that for example may be generated using compilation options of the compiler (-fpic).

One way of achieving position independent code is to make the calls of a protected function 120 indirect, e.g. by referencing the jump address in an Import Address Table (IAT) table. This way, the call instruction does not change if the jump address is shifted, and the checksum value of the calling protected instruction is constant.

However, if it is not possible to obtain position-independent code, it is nevertheless possible to predict the checksum value of the relocated protected function. A drawback of this is that the checksum function is more complex and needs to access a relocation table embedded in the binary headers of the application (the section .reloc for Windows). Using this information, it is possible to calculate the checksum value of the relocated function without having recourse to the checksum function 260, which is used to verify the integrity of the protected function.

As has already been mentioned, a protected program may have a plurality of protected regions R. It is for example possible to have two distinct regions R1 and R2 that do not overlap, each region housing a protected function as described with reference to FIG. 2.

A function is preferably a set of instructions that has at least one (preferably exactly one) entry point and at least one exit point. It is advantageous for the function to comprise a number of instructions so that the function itself is not trivial, but not too many instructions so that the function becomes 'heavy' to relocate.

Figure 3:
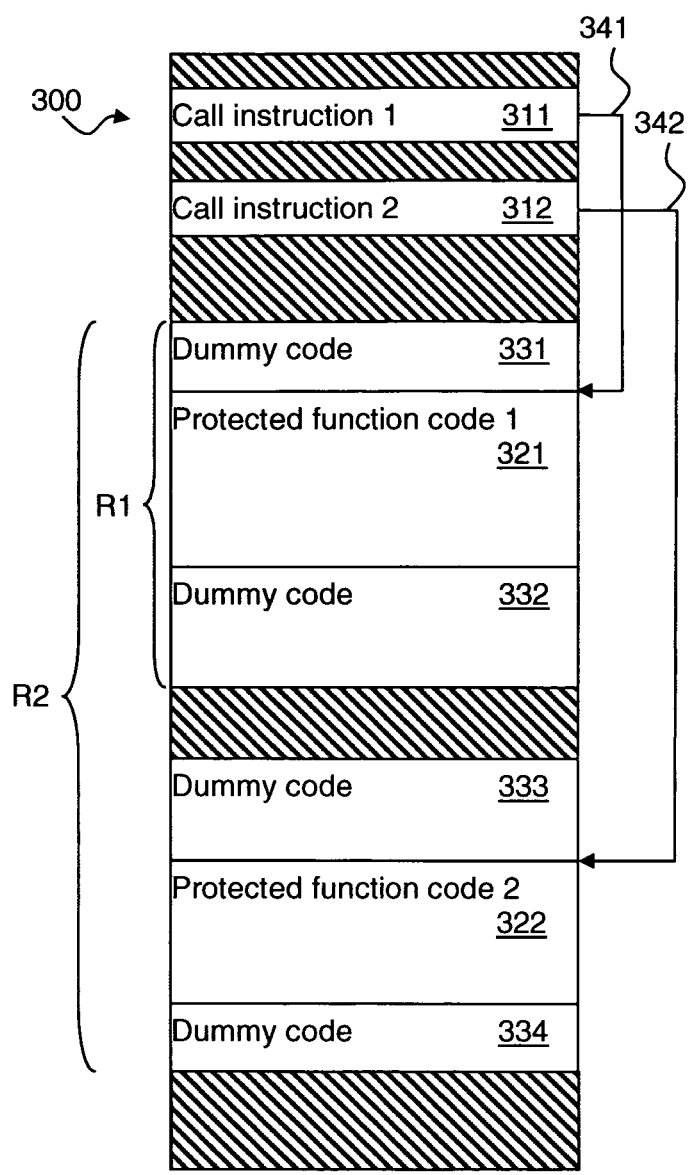
FIG. 3 illustrates further possibility for code protection using multiple ranges according to a preferred embodiment of the present invention.

FIG. 3 illustrates another possibility for code protection using multiple ranges according to a preferred embodiment of the present invention. A memory 300 comprises a first call instruction 311 to a first protected function 321 and a second call instruction 312 to a second protected function 322. Each protected function 321, 322 is surrounded by dummy code 331, 332, 333, 334, and each function 321, 322 is executed by having the respective call instruction 311, 312 call 341, 342 the address of the protected function 321, 322.

As can be seen, the memory 300 comprises two regions, R1 and R2, each protected by a checksum. Region R1 comprises the first protected function 321 and the surrounding dummy code 331, 332. Unlike the already described embodiment where each region corresponds to a different function, region R2 comprises region R1, the second protected function 322 and its surrounding dummy code 333, 334. It will be appreciated that the diagonally hatched area between region R1 and dummy code area 333 preferably does not change; if it does change, then it should do so in a predictable manner. The easiest solution is to make region R1 and region R2 adjacent, but it is naturally also possible to make sure that this diagonally hatched area is never touched.

A checksum range may thus comprise several regions provided that the checksum range does not have any partial intersection with any region and that it does not include calling point to any regions. If these requirements are not complied with, then it is likely that the integrity value is not constant and unpredictable over the time.

As for the checksum function, it is preferably chosen to satisfy the requirements of checksum predictability and checksum alignment.

Checksum predictability means that the checksum function is able to obtain the current checksum value from the previous checksum value, i.e. the checksum value before the latest transformation. Another way of expressing this is that the checksum function is able to obtain the next checksum value from the present checksum value. The checksum value of a region is preferably the combination of two sources: the checksum of the dummy code and the checksum of the protected function.

As already mentioned, if a protected function may be relocated without modification—e.g. Linux relocatable code—then its checksum is invariant, which is a preferred feature. In this case, the checksum remains the same before and after relocation. It is however also possible, in case the protected function is not checksum-invariant, for the checksum function to rely on the relocation tables of the program to compute the impact of relocation on the code so as to be able to generate correct checksum values.

In addition, the checksum of the dummy code must be deterministic. At each transformation, a dummy code (M) is replaced with E(M). After n transformations, the checksum value C equals EoE . . . oE(M)=En(M). It is possible to choose a simple linear transformation so that C=En(M) =n*$E_0$(M).

Then after n transformations:

$$Cn(\text{Region}) = Cn(\text{function}) + Cn(\text{dummy code})$$

$$= C(\text{function}) + n^* E_0(M)$$

$$= A_0 + n^* B_0$$

where $A_0$ is the checksum value of the checksum-invariant protected function and $B_0$ is the checksum of the initial dummy code.

Hence, the checksum value of a region R may be found by a polynomial equation dependent on input n, where n is the number of transformations over time.

Checksum alignment means that the checksum value of the two (or possibly just the one) dummy code areas surrounding a protected function is constant no matter where in the region R the protected function is located, i.e. however it splits the dummy code areas. This may be achieved by choosing a checksum function by block so that the splitting jitter J is a multiple of a unitary checksum block size. Typically, a checksum that operates on 4 bytes block size permits to split at random addresses that are multiples of 4 bytes. In at least this case may it be necessary to pad the function so that its length is a multiple of 4 bytes, so that the function and the dummy code occupy the whole region R.

The code modification engine is adapted to relocate a protected function inside a region R during execution of the program. In order to do this, the code modification engine should know the invocation points where the protected function is called. This may be accomplished by a post-build tool that:

At compilation time
  performs a static analysis of the program to deduce call graphs and instructions blocks,
  determines the invocation points in the call graph to the protected function, and
  computes the checksum reference value of each region.
At running time,
  when the code modification engine relocates a protected function, it should also fix the offset of the calling instructions to the function (invocation point).

Typically, at each transformation, the code modification engine:
  generates a random offset,
  shifts the protected function inside the region R using the random offset, transforms the dummy code inside the region R with a specific transformation algorithm (as already described herein), fixes the offset of all invocation points of the protected function to the random offset, and memorizes, advantageously in a secure place, the number n of the current transformation. This number n may later be used by the checksum routine to compute the checksum value of the dummy code.

It will be appreciated that in practice, it may be necessary to memorise temporarily the dummy code, the function or both the dummy code and the function during the transformation, so as to ensure that one is not overwritten by the other.

The checksum function is preferably independent of the code modification engine; whenever a checksum is calculated, it is invariant by design.

Multiple checksum functions are preferably called by additional threads in the program at random intervals or at predetermined points of execution.

A post build tool should also inject in the program the initial checksum values for each protected region (before any transformations), in order to render possible the checksum verifications.

Figure 4:
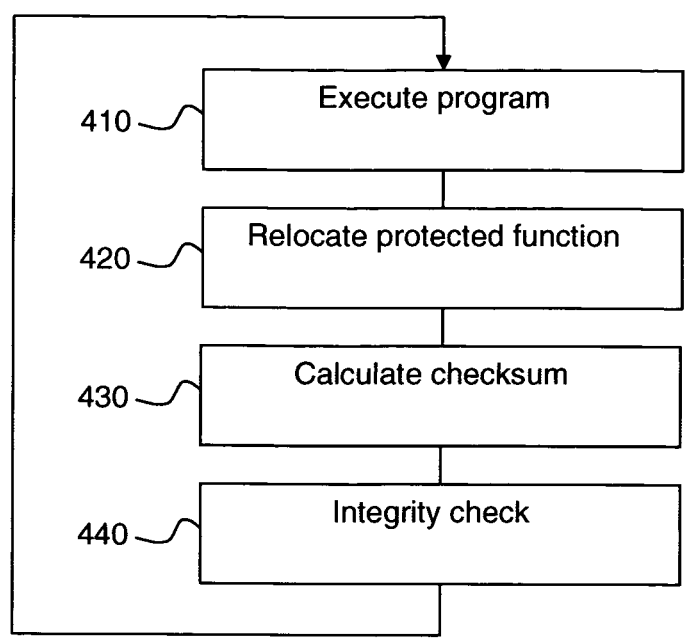
FIG. 4 illustrates a flow chart of a method for protected program execution according to a preferred embodiment of the present invention.

FIG. 4 illustrates a flow chart of a method for protected program execution according to a preferred embodiment of the present invention. The program executes normally in step 410. At a given point, one or more protected functions are relocated 420, as previously described herein. Then checksum of the relocated function is then calculated 430, as previously described herein. It is preferred that the checksum function 260 verifies 440 the integrity of the relocated function at least once. 'Normal' program execution then resumes in step 410.

The skilled person will appreciate that a program protected by the present invention is auto-modifying: the content of regions is transformed over time, which can make it resistant to typical Translation Lookaside Buffer (TLB) attacks, in which programs manipulate virtual addresses, while the hardware works with physical addresses. The TLB is a table that allows a translation between such addresses.

The skilled person will also appreciate that the invention adds some jitter to the starting address of function, which can make function resistant to hardware breakpoint and replay attacks.

The skilled person will also appreciate that the invention uses some dummy code around a protected function, which can counter disassembling of the code.

The skilled person will also appreciate that the software integrity can be stealthy. The randomization of the function mapping occurs in the section of code and not in the heap. In another implementation, it is also possible to relocate a function at a random address in the heap (in a allocated buffer with malloc( )), but it then becomes more difficult to compute the integrity of the function in a stealthy way. According to a preferred embodiment of the present invention, the protected region is inserted inside other legacy code, making it possible to apply a checksum range on a larger area that encompasses the region, without explicitly mentioning the start and the range of the region.

The skilled person will also appreciate that the integrity of a region is deterministic and predictable by design. The code modification and the integrity property are not linked. It is possible to implement integrity with multiple checked ranges, which can cross over at any time because the integrity value of a region, even randomized, is predictable.

The skilled person will also appreciate that the expression "dummy code" as used herein may be random or pseudo-random data, close to randomly generated nonsense code, but that it may also be real, functional code (e.g. taken from an old program that is no longer used). It is preferred that the dummy code resembles real code, as this makes it more difficult for an attacker to analyse the contents of the memory. Another way of looking at it is that the dummy code is the data in a region that does not correspond to the function code, i.e. it is non-function data, and that a checksum is generated for the part of the region that does not contain the function code.

It will be appreciated that the present invention can provide a way of verifying the integrity of relocated software code.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of relocating function code in a memory during execution in a device of a software program comprising the function code, the method comprising the steps in a processor of:
    relocating the function code in a region of the memory comprising dummy code during execution of the function code;
    transforming the dummy code in a deterministic manner, wherein the transformation of the dummy code comprises permutation;
    generating a predicted checksum for the region based on a previous checksum;
    generating a calculated checksum over the region; and
    verifying the integrity of the function code by comparing the predicted checksum and the calculated checksum, where the checksum for the region is a combination of a checksum for the function code and a checksum for the dummy code.

2. The method of claim 1, wherein the function code is position independent code, and wherein the function code has with a constant checksum value.

3. The method of claim 1, wherein the checksum of the function code for the predicted checksum is calculated using a relocation table.

4. The method of claim 1, wherein a checksum of the dummy code is unchanged by the transformation.

5. The method of claim 1, wherein the transformation of the dummy code comprises permutation as blocks of a predetermined size.

6. The method of claim 1, wherein the transformation is linear with a deterministic effect on the checksum of the dummy code.

7. The method of claim 1, wherein the region of the memory comprises further function code and further dummy code that also are used when a checksum value is calculated.

8. The method of claim 1, wherein the dummy code is real code.

9. The method of claim 1, wherein the function code is implemented as a module or as an instruction block.

10. The method of claim 1, wherein the previous checksum is a checksum for the region.

11. A device for execution of a software program and relocation of function code of the software program in a memory during execution of the software program, the device comprising:
- a memory for storing the function code and dummy code in a region of the memory; and
- a processor for:
- relocating the function code in the region of the memory during execution of the function code;
- transforming the dummy code in a deterministic manner, wherein the transformation of the dummy code comprises permutation;
- generating a predicted checksum for the region based on a previous checksum;
- generating a calculated checksum over the region; and
- verifying the integrity of the function code by comparing the predicted checksum and the calculated checksum, wherein the checksum for the region is a combination of a checksum for the function code and a checksum for the dummy code.

12. The device of claim 10, wherein the function code is position independent code, and wherein the function code has with a constant checksum value.

13. The device of claim 10, wherein the processor calculates the checksum of the function code for the predicted checksum using a relocation table.

14. The device of claim 11, wherein the checksum of the dummy code is unchanged by the transformation.

15. The device of claim 14, wherein the processor uses permutation as blocks of a predetermined size to perform the transformation of the dummy code.

16. The device of claim 10, wherein the transformation is linear with a deterministic effect on the checksum of the dummy code.

17. The device of claim 11, wherein the region of the memory comprises further function code and further dummy code that also are used when a checksum value is calculated.

18. The device of claim 11, wherein the dummy code is real code.

19. The device of claim 11, wherein the function code is implemented as a module or as an instruction block.

20. The device of claim 11, wherein the previous checksum is a checksum for the region.

21. A non-transitory computer program product having stored thereon instructions of a software program, wherein the instructions, when stored in a memory and executed by a processor performs the steps of:
- relocating relocates function code of the software program in a region of the memory comprising dummy code during the execution of the function code;
- transforming transforms the dummy code in a deterministic manner, wherein the transformation of the dummy code comprises permutation;
- generating generates a predicted checksum for the region based on a previous checksum; generating a calculated checksum over the region; and
- verifying verifies the integrity of the function code by comparing the predicted checksum and the calculated checksum, where the checksum for the region is a combination of a checksum for the function code and a checksum for the dummy code.

* * * * *